Fig.1.

June 11, 1935.  J. F. TURNER ET AL  2,004,558

STOKER MOTOR

Filed Dec. 30, 1932   7 Sheets-Sheet 5

Patented June 11, 1935

2,004,558

UNITED STATES PATENT OFFICE 2,004,558

STOKER MOTOR

James F. Turner and Christian P. Breidenbaugh, Baltimore, Md., assignors to Flynn & Emrich Company, Baltimore, Md., a corporation of Maryland Application December 30, 1932, Serial No. 649,558

19 Claims. (Cl. 60—52)

This application is in part a continuation of application No. 612,702, filed May 21, 1932. It relates to a motor of the hydraulic type, the hydraulic fluid being preferably delivered to the motor at suitable operating pressures by means of an electric driven pump, though the motor may be otherwise operated as by means of steam or water or other fluid supplied at a suitable pressure from any convenient source.

While the motor is capable of more general application, it has been designed and developed and is best adapted for use in connection with, or more properly, as an element of a mechanical stoker. The stoker of the copending application is of the underfed center retort side dump type, the coal being forced into the retort by means of a piston or ram which is shown as directly connected to the motor piston to be operated thereby.

In the copending application, the motor also operates the mechanical fuel bed slicing bars which are of arcuate or segmental shape and pivoted to swing upwardly out of the grate surface and forwardly in the direction of the flow of the fuel.

The hydraulic motor of the invention is of the periodic type and is so devised that the fuel bed slicing bars are operated at predetermined intervals, the length of the intervals corresponding to the intervals at which the feed ram is operated. An important advantage of the improved type of motor described in the previous application, and included as a feature of the present application, is that the motor is adapted to operate both the ram and the slicer bars so that while the ram and slicer bars are normally stationary, they are reciprocated at predetermined intervals. These intervals may in the preferred form be varied by a simple adjustment, the length of the intervals between reciprocation being suitable feeding intervals. The speed of the forward and return stroke of the piston and hence of the ram which is operated directly or substantially directly from the piston and the speed of the slicer bars are wholly independent of the intervals between strokes and of the variation of their intervals.

In accordance with the operation to be described, the motor of the invention imparts to the slicer bars a movement whereby they are swung with a quick motion upwardly and forwardly in the direction of motion of the fuel and are returned immediately and with a similar speed to their normal position in which their fuel supporting surfaces are in the plane of the floor of the combustion chamber. In accordance with this improved operation which results from the periodic operation of the motor, the period in which the slicer bars remain in the burning fuel bed is reduced to a minimum and is independent of the time interval which intervenes between strokes.

An important feature of the improved motor resides in the provision of means whereby the electro hydraulic drive operates under full load pressure only during the forward stroke of the piston to which the ram is connected to operate simultaneously therewith. The hydraulic fluid is circulated between working strokes at a minimum idling pressure which places practically no load on the electric motor and reduces the power cost to the minimum. This reduction of the normal load makes it feasible to use a motor of relatively low horse power under relatively heavy load conditions without danger of burning due to the low pressure pumping period which intervenes between the working strokes of the hydraulic motor and incidentally of the ram and slicer bars providing a prolonged cooling period after each heavy load, the heavy load periods being in fact, of very short duration.

It should be understood in this connection that the electro hydraulic drive of the invention which is best adapted to operate the ram and slicer bars referred to, makes at predetermined intervals a complete stroke cycle, i. e., a forward stroke under full pressure and immediately thereafter a quick motion return stroke under low pressure and between strokes it idles at low pressure. This timing of the motor, which operates normally under low pressure, and which at suitable intervals performs its working stroke only, at high pressure, is of particular importance in its application to the operation of the slicer bars which to prevent burning must have a quick forward and return movement at suitable intervals. If the motion of the slicer bars were slowed down on account of the increase of the interval between strokes, they would be quickly burned and destroyed or otherwise would not have the length of life which is requisite not only to economy but to a continuous operation of the plant.

A further important feature of the invention of the present application relates to the construction of a stoker motor which may be more properly termed an electrohydraulic drive in a single block or casting which includes the main cylinder, the ram guide, the feed cylinder or trough to which the hopper is secured, the reservoir in which the hydraulic fluid is held for delivery to the pump and which in the preferred form encloses the pump. All or practically all the passages for the transfer of the hydraulic fluid from the pump to the valves and hence to the cylinder and back to the reservoir are formed in the enbloc casting. By this arrangement the troublesome elements of leakage between the castings and from various pipe joints is completely eliminated and the various difficulties as to boring, tapping, packing and machining the contacting surfaces in assembling a plurality of castings in accordance with the usual practice in the construction of such motors, is avoided, the parts being in a single piece so that there is no fitting and assembling problem or operation and no tendency to loosening or play.

The improved construction also includes a new type of hydraulic relief valve to eliminate back pressure in case the ram becomes cramped or locked by any obstruction which may be located in its path resulting from the feeding of tramp iron which will not pass through the channel or other foreign substances and the like. This relief valve is connected to the pump delivery and discharges into the reservoir, being completely enclosed within the reservoir as is the pump itself in the preferred form. The electric motor which moves the liquid and applies operating pressure thereto during the working stroke is shown as mounted on a bracket, the base of which forms the lid of the oil chamber. The invention also includes a new and improved type of quick release valve which provides for the quick motion of the piston during the last part of its downward stroke. This not only causes the speed of the piston to be maintained to the end of the stroke but provides a quick operation of the valves, whereby the tendency to hesitation by the piston at the beginning of the return stroke which might cause dwelling of the slicer bars in the fire, is avoided.

In the accompanying drawings we have illustrated an electrohydraulic drive of the intermittent type embodying the features of our invention in the preferred form.

Referring to the drawings by numerals, each of which is used to indicate the same or similar parts in the different figures, the construction shown comprises a fuel hopper 1, below which is a feed trough or hopper feed cylinder 2, the same being continuous with the ram guide 3 containing fuel feed ram 4 which is mounted to reciprocate longitudinally of the trough and guide in accordance with the usual practice. Immediately above the guide 3 is the oil reservoir 5 which may contain any suitable actuating fluid. Enclosed within the reservoir is a rotary pump 6 driven by means of an electric motor 7. The power is transmitted from the motor to the pump by means of a chain 8 or any other suitable belt or transmission drive, and in accordance with the preferred arrangement the motor is carried by bracket or base 10, the base plate 11 of which in the form of the invention shown as a cover for the reservoir.

The ram guide 3 is slotted as at 12 to provide for a link connection 23 between the ram 4 and the stoker mechanism whereby this latter mechanism is operated by movement of the ram.

Figure 3:
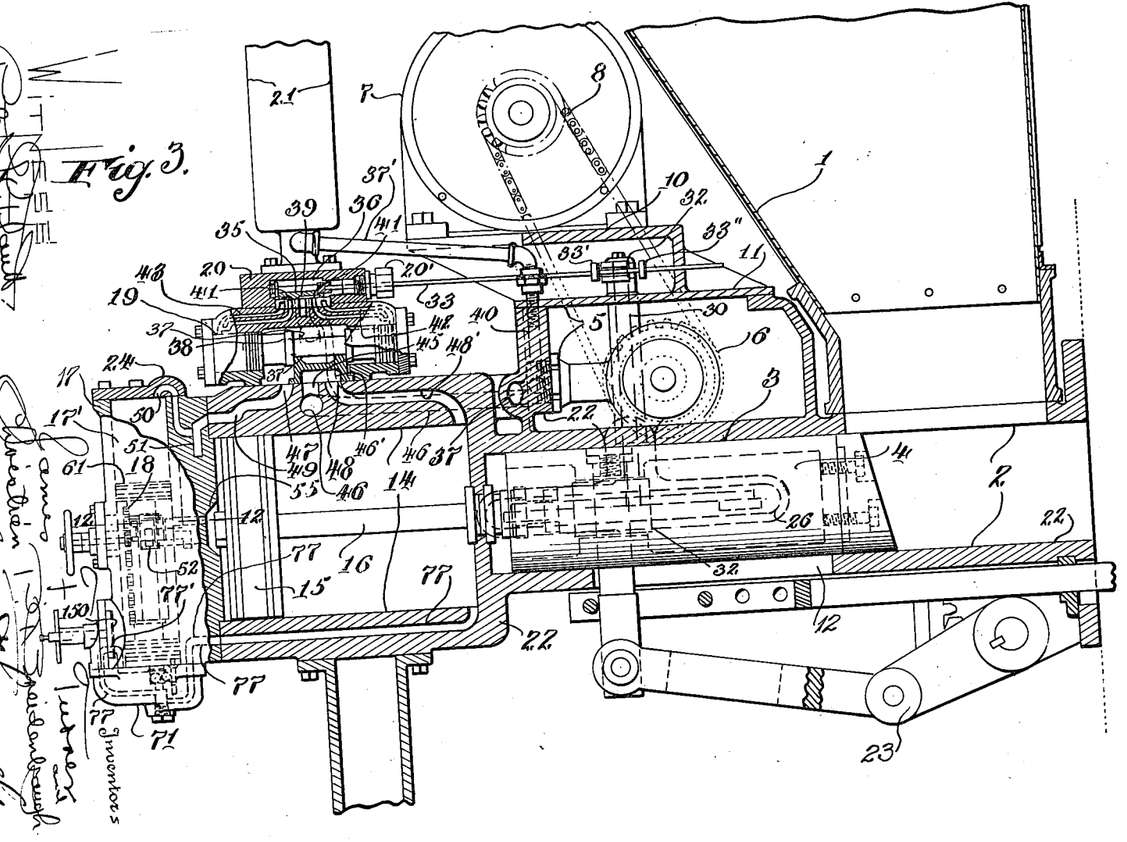
Figure 3 is a vertical longitudinal section on the common axis of the main cylinder, ram guide and feed trough looking from the right in Figure 1 and showing the parts in position for the working stroke.

Aligned with the ram guide 3 and immediately forward thereof is the hydraulic cylinder or main cylinder 14 in which the main piston or hydraulic piston 15 reciprocates, it being actuated by the hydraulic fluid as hereinafter described. This piston 15 is in the preferred form shown directly connected as by means of piston rod 16 to the ram 4. The cylinder 14 is closed at the forward end by a suitable head which includes the cylindrical casing 17, and chamber 17' formed therein of the stoker motor control valve mechanism 18 which will be further described.

The main cylinder 14 carries mounted thereon at the top, the piston control valve casing 19 on the top of which is mounted the pilot valve casing 20. The construction shown also includes an air expansion chamber 21 which is secured to the top of the pilot valve casing.

An important feature of the invention, aside from the details of construction and the intermittent operation of the motor reciprocating the ram and the slicer bars at the desired regulated intervals, the bars being caused to operate with a quick forward stroke and an immediate quick return, and the ram being likewise moved, the speed of the forward and return stroke being practically constant and independent of the variation of the periods intervening between operations, resides in the enbloc feature referred to, i. e., the construction of the main cylinder, the ram guide, the feed trough and the oil reservoir in which the pump is enclosed and including the valve passages in a single casting, dispensing with the necessity for piping and for joining the several different main castings together involving the use of packing and the provision of drilled and tapped holes and the unavoidable working loose of the castings and the stripping of threads and blowing out of packing.

Figure 2:
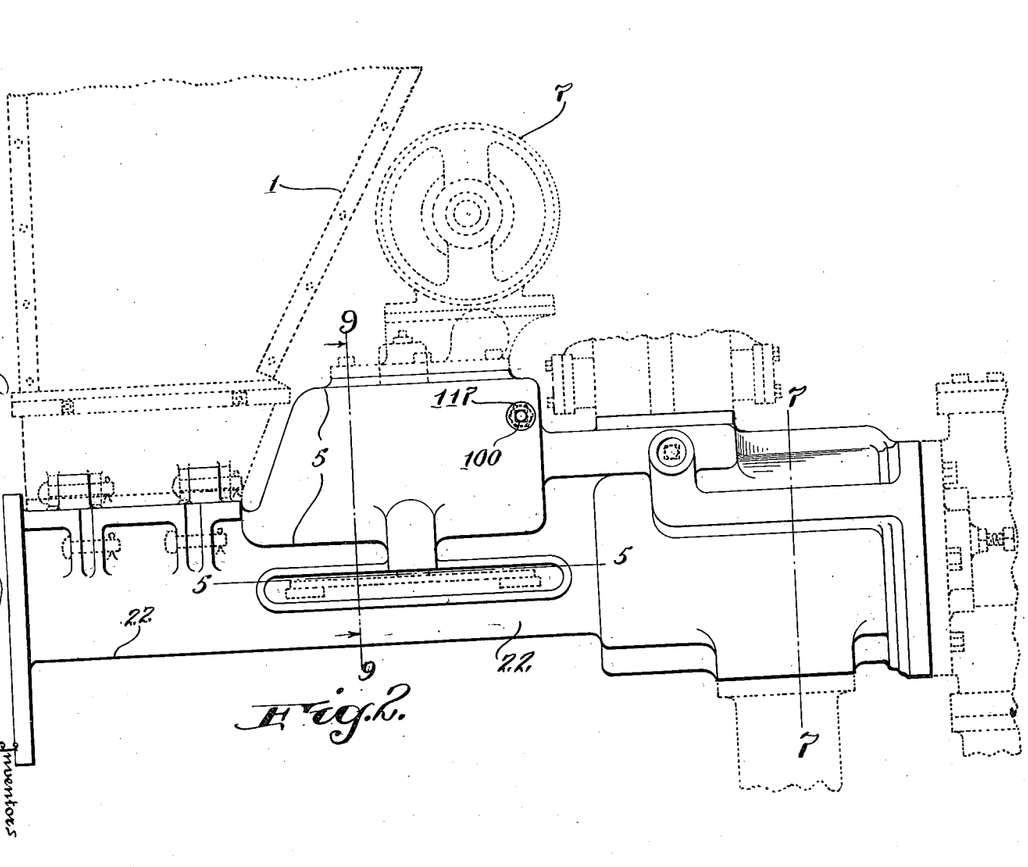
Figure 2 is a side elevation of the enbloc casting looking from the left in Figure 1, including the main cylinder, the hopper feed trough, the ram guide and the oil reservoir, the hopper, the electric motor and motor bracket. The piston control valve chamber and the stoker motor control valve chamber are indicated in this figure by dotted lines.

This casting is indicated in the various figures by reference character 22. The casting is best illustrated in Figure 2 which shows the casting only in full lines, the annexed parts being shown in dotted lines, and in Figure 4 which shows the casing in top plan, the annexed parts external to the enbloc casting being removed.

Figure 1:
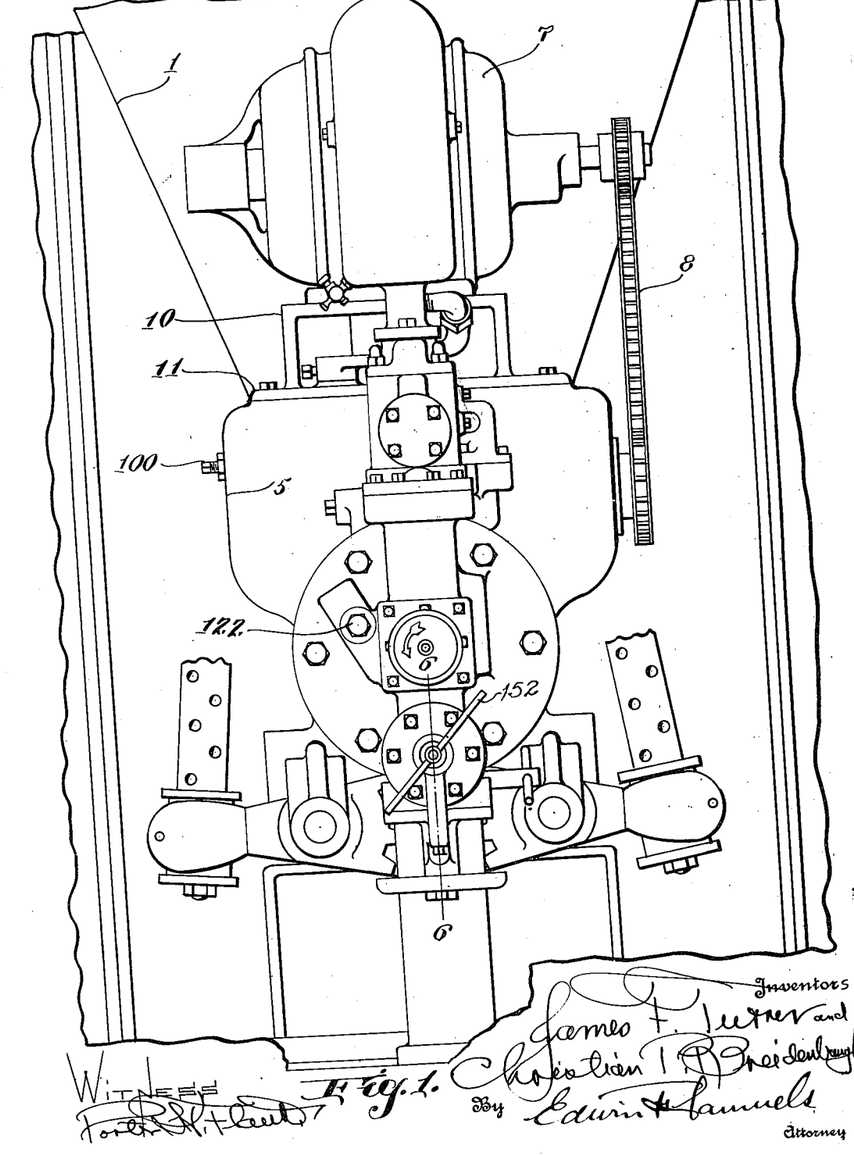
Figure 1 is a front elevation showing the electrohydraulic drive of the invention assembled in its operative relation to and with a stoker feed hopper.

Referring now to Figure 3, the stoker motor is indicated in a general way by reference character 24. This latter will be discussed in connection with a description of its operative parts and the method of operation. The ram 4 carries on its side, which is at the left in Figure 1 and is back of the plane of the section in Figure 3 a rocker mechanism comprising a horizontally projecting dog or tooth 25, see particularly Figure 5. This dog operates in and projects into or through a horizontal slot 26 in the ram guide or cylinder 3. This dog, as it reciprocates, engages alternately the rollers 27 and 28 on the opposite ends of a rocker arm 29 mounted on the upright rocker shaft 30 shown in plan, Figure 5. This shaft is supported in suitable bearings and carries at its upper end a horizontal arm 31 which projects toward the observer in Figure 3. The outer end of this arm is bifurcated as at 32 and straddles a sliding rod 33 which is operated thereby, i. e., the bifurcated end 32 as it oscillates alternately engages collars 33′ and 33″. Rod 33 enters pilot valve casing 20 through packed bearing 20′ and this rod carries at its forward end a sliding valve or pilot valve 35 which is reciprocated in pilot valve chamber 36 in the casing 20 by the rocking of the arm 29 due to contact of the dog 25 with the rollers 27 and 28 at or near the opposite ends of the stroke of the ram.

The pressure chamber 36 in the pilot valve casing 20, together with the pressure chamber in the piston valve casing 19 in which functions the piston control valve 38, may be connected in any suitable manner to the hydraulic pressure source as by way of the pressure pump delivery passage 37 as shown fragmentarily in Figure 3 of the drawings, i. e. a portion of this passage 37 having been broken away in this particular figure. The continuation of this pressure passage 37, which is a part of the main casting structure 22, is also a part of and cast integral with the pilot valve casing 20 and the piston control valve casing 19. The exhaust passage 46′ leading from the pilot valve pressure chamber 36, to the common exhaust return passage 46 as indicated in Figure 3, allows for doing away entirely with the use of piping and its attendant leakages.

As described above, the pilot valve casing 20 and its pressure chamber 36 is connected to the hydraulic pressure source by way of the pressure pump delivery passage 37, which is formed integral with the casings 19, 20 and 22, whereby hydraulic fluid at suitable operating pressures is supplied to the pilot valve chamber and therefrom to the piston valve casing 19 at suitable intervals determined by the reciprocation of the ram, and hence to the main cylinder 14. In other words, the working stroke of the main piston 15 occurs after a dwell following the return stroke of the same, the intervening period being determined by the stoker motor control valve mechanism.

The present apparatus is provided with the usual pressure expansion unit or chamber 21 which may be connected by way of the pipe 37′ to the pressure side of the hydraulic pressure pump by means of the passage 40 which in turn is connected to the hydraulic pressure passage 37, as shown particularly in Figure 3 of the drawings. The purpose of the pressure chamber 21, is primarily to absorb or cushion the pressure shocks caused by the sudden building up of accumulated pressure which is coincident to the passage of the piston control valve 38 over its dead center position which momentarily blocks off the flow of the hydraulic fluid under pressure.

Sliding or pilot valve 35 controls the operation of piston control valve 38, the piston control valve being reciprocated at suitable intervals by the flow of hydraulic fluid as it is released at the opposite ends of the cylinder in the casing 19 by the operation of the pilot valve.

Figures 4, 5:
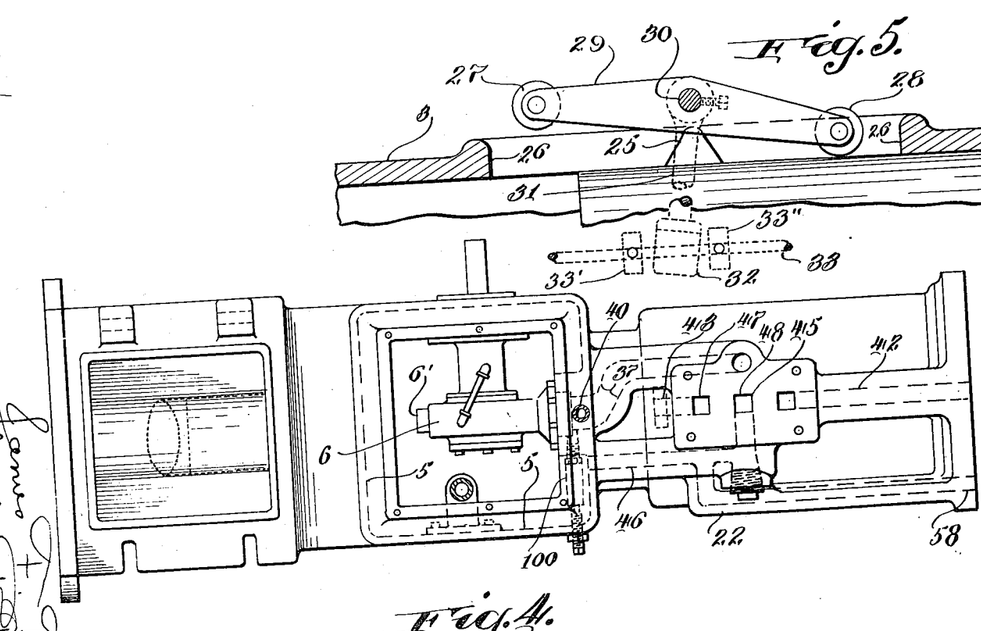
Figure 4 is a top plan view of the enbloc casting, the lid of the reservoir and also the hopper being removed.
Figure 5 is a fragmentary plan view of the rocker arm for reciprocating the pilot valve from the ram. For convenience the enbloc casting is sectioned on line 5—5, of Figure 2.

In the construction shown the chamber 36 of the pilot valve is connected by the passage 37 to the pump delivery, the passage 37 being formed in the castings 19, 20 and 22 as shown in Figs. 3 and 4. The ports 41 are connected by their passages 42, 43 to the ends of valve casing 19 in the usual manner.

Thus, as already stated, the position of the control valve 38 is determined by the position of the pilot valve 35 which is in turn determined through rocker mechanism 27, 28, 30, 32 previously described by the position of the ram and of the main piston 15 of the stoker motor. The control valve chamber has a central exhaust port 45 connected to the reservoir in which the pump 6 is located, by a passage 46 in the casting 22. The intake of the pump is also directly connected to the reservoir. The control valve chamber also has supply ports 47, 48 on the opposite sides of the exhaust port 45. The supply port 48 is connected directly to the exhaust end of the stoker motor cylinder 14 by a passage 48′ and the supply port 47 is connected through the stoker motor control valve chamber 17 as hereinafter described with the pressure end of the stoker motor cylinder. It has already been stated that the piston control valve casing 19 is secured to the top of the main cylinder portion of the enbloc casting 22 and the stoker motor control valve chamber is secured to the head end, i. e., the pressure end of the main cylinder which is at the forward end of said casting, i. e., nearest the operator when he stands in front of the furnace.

The above described arrangement of parts in connection with the valve mechanisms in the casings 19 and 20 are conventional in their design and no claim is made in this application as to any novelty existing in connection with the same. The novelty in this application resides rather in the use and specific function of these mechanisms in the unitary stoker control device and not in their inherent construction per se.

The construction and arrangement of the stoker motor control valve mechanism 18 will be best understood by tracing the operation of the parts therein included, which involves a complete disclosure of the operation of the motor.

It will be noted that the supply port 47 is connected by a passage 49 to the valve chamber head 51. This pressure and exhaust passage 51 extends downwardly in the walls of the stoker motor control valve casing 17, and is connected to the flapper valve port 52 which is covered and uncovered at intervals by the flapper valve 53. This port is located in the inside wall of the valve casing 17 at an intermediate point and the valve chamber 17' has a connection preferably near the center by way of port 54 to the intake and exhaust port 55 at the pressure end of the stoker motor cylinder 14, i. e., the end at which the working stroke begins and the return stroke ends, which is at the left in Figure 3. The chamber 17' is also connected at a point immediately below the port 54 by a port 57 to a by-pass and exhaust passage 56. This passage 56 leads to the by-pass passage 58 formed in block 22, Figures 4 and 12, and leading to the reservoir 5. The flapper valve 53 is hingedly mounted on floating valve 60 and is closed by a spring 59. It acts not only as a control for port 52, but in connection with the floating valve as a frictional means for holding the floating valve in any position in which it may be left by the operation of the piston valve 61. This piston valve 61 as shown consists of two pistons or heads 62, 63, spaced apart by a distance which may comprise a large proportion of the length of the chamber 17' and connected by a shaft 64. The floating valve 60 is mounted on this shaft 64 to slide freely thereon, being held against rotation by a spline 65'. The floating valve 60 has a considerable degree of play toward and from its seat, which is the inner surface of the valve chamber, so that the hydraulic fluid may escape, i. e. exhaust by it through port 54, entering the valve chamber 17 from main cylinder 14 and passing through the pressure and exhaust passage 51 by way of the exhaust or by-pass passage 56, 58 to the reservoir 5.

The control valve 38 is shown, Figure 3, in the position in which the port 47 is open to hydraulic pressure from the pump whereby hydraulic fluid under pressure is led to the head end of the cylinder 14 at the left in Figure 3. In this figure the rear end of the stoker motor cylinder is open to exhaust, the stoker motor piston being at the beginning of the working stroke, the valve mechanism 18 being in a corresponding position.

Figures 11, 12:
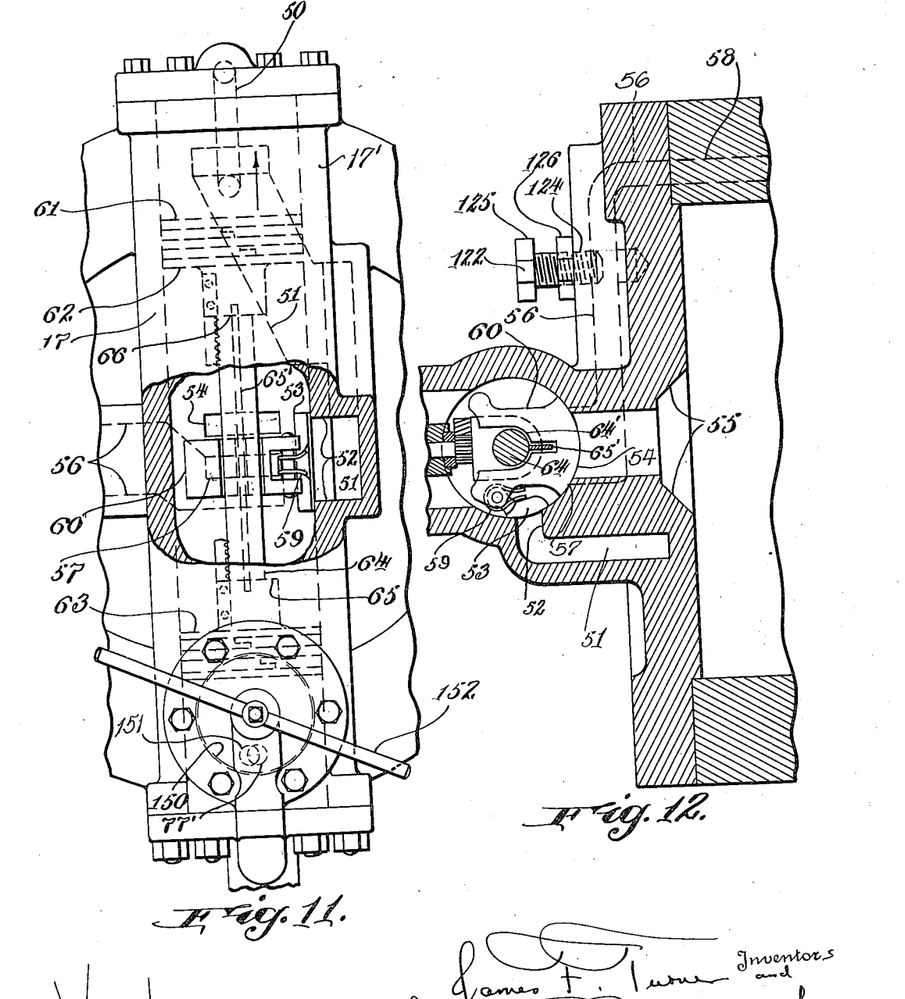
Figure 11 is a detail view of a fragmentary nature and partly in section of the stoker motor control valve casing and assembly.
Figure 12 is a horizontal section of the same taken on the line 12—12 in Figure 3.

In Figure 11 the stoker motor control valve parts are in the bottom position corresponding to a period between the end of the working stroke, and the beginning of the return stroke of the main piston 15. At this time admission of pressure fluid by way of ports 52, 54 has ceased and the valve piston 61 is moving upwardly due to the admission of pressure to the rear end of cylinder 14. This upward motion is a quick motion which removes the floating valve to its upper position providing for a free exhaust from the head end of cylinder 14 by way of ports 54, 57. Valve port 54 is covered, but the exhaust pressure forces the floating valve 60 from its seat so long as there is an excess of pressure in cylinder 14. When the exhaust has been completed, the motor fluid enters chamber 17' through passages 49, 50, 51 and port 52. The fluid thus admitted between the piston heads 62 and 63 is passed out through the by-pass port 57 and passage 56 and 58 to the reservoir which is connected to the suction side of the pump.

As already pointed out, the stoker motor which is the subject of the invention, is of the intermittent type having a quick forward and return stroke and a long intermittent period of rest during which the hydraulic pump and the electric motor which drives it and particularly the latter, are operating at a minimum load. In addition to by-passing the fluid from the pressure side of the pump as aforesaid, the fluid also enters at the top of chamber 17' over the top piston 62 of valve 61, giving it a downward tendency which moves the valve 61 downwardly at a predetermined speed which can be varied and adjusted at the will of the operator. This regulatable operation of the valve 61 intervening between the end of each return stroke and the beginning of each working stroke, is the means for determining the variable period between working strokes which may be and is in accordance with the practice of the invention changed at the will of the operator without changing the speed of the working stroke, and is an important feature of the invention.

In the interest of absolutely assuring in a substantially positive manner the proper timing in a predetermined manner of the strokes of the stoker motor, the timing of the opening and closing of the various control valves and their cooperative exhaust and pressure passages have been so arranged and timed as to cause the control piston valve 61 to at all times substantially complete its return or upward stroke, under the full pressure of the hydraulic motor 6, before the main stoker piston 15 may begin its return stroke towards the position it assumes previous to its forward or working stroke. Thus, the time control piston valve 61 is always substantially at the top of its cylinder 17 or in its proper extreme upward stroke position ready to begin its downward and very important timing stroke, when the main stoker piston 15 completes its return or backward stroke.

As may be readily seen, this particular function on the part of the time control piston valve 61 fully preceding the return stroke of the larger and heavier main stoker piston 15 is brought about as follows: The time control piston valve 61 having completed its downward stroke is at the bottom of its cylinder 17, the main stoker piston 15 having completed its forward or work stroke, is at the right or forward end of its cylinder 14; the piston control valve 38 having changed its position to that shown in Figure 3 of the drawings permits the port 48 and passage 48', to be fully opened and to allow the hydraulic fluid under pressure to enter the cylinder 14 in front of the large piston 15, thence by way of the passage 77 and valve structure 75 to the underside of the time control piston valve 61. Referring to Figure 11 of the drawings, the floating and flapper valves, 60 and 53, respectively, at this time are blocking off the by-pass port 57 and the pressure and exhaust port 52 as shown in this particular figure. Thus, the larger piston 15 is prevented from moving backward on its return stroke due to the blocking off or closed position of its fluid exhaust ports 52 and 57. The time control piston valve 61 is thus enabled to receive the full benefit of the hydraulic pressure from the pump 6, and is forced in a positive manner to proceed on its up stroke to the upper part of its cylinder 17. Substantially near the end of its upstroke the time piston 61 abuts with the floating valve 60 which is more fully described hereinafter, moving the same and causing the ports 52 and 57 to be fully opened, allowing for the proper exhausting of the hydraulic fluid from the main cylinder 14 by way of its exhaust and pressure port 54 and the return of the main piston 15 on its back stroke under hydraulic pressure. Upon the main stoker piston 15 reaching this complete return stroke position, the important timing and downward stroke of the time control piston 61 takes place. In this manner the functioning and controlled movements in their proper sequence, of the pistons 61 and 15 are assured in a positive manner.

It should be understood in this connection that the upward stroke of the piston 61 moves the floating valve 60 and the flapper valve 53 just prior to the return stroke of the main piston 15, from their lower positions shown in Figure 11, to their upper positions, in which positions the exhaust of the main cylinder 14 takes place, this movement of the valves 60 and 53 causing the ports 57 and 52 to be uncovered. Substantially at the time when the main piston 15 has completed its backward or return stroke, the control valve and piston structure 38 changes its position, opening the port 48 to the exhaust and the port 47 to the hydraulic pressure source. Substantially at this moment the time control piston valve 61 begins to descend on its downward or time stroke. During this period the float valve 60 is in its upper position, i. e. closing port 54 and exposng ports 52 and 57. Thus, the hydraulic pressure fluid exerting pressure on the top of the time piston valve 61 by way of passages 49 and 50, is also passing down through the passage 51, thence through open ports 52 and 57 to by-pass passage 56 (the port 54 at this time being closed) thence to the fluid reservoir. Upon the time piston valve 61 having descended sufficiently to abut the floating valve 60, moving it to its downward position, again closing the ports 52 and 57, the fluid that has previously been passing these ports is suddenly blocked from being by-passed to the fluid reservoir by way of the port 57. This fluid under pressure is then diverted in its passage and sent into the main cylinder by way of the now opened port 54, and causes the main piston 15 to move forward on its work stroke. There is no difficulty as to the fluid under pressure passing the closed port 52, as the valve 53 that covers this port is of the yielding or flapper type and readily allows the hydraulic pressure to pass this point.

Reviewing the above, the piston valve 61 moves downwardly due to the admission of fluid by way of passage 50 so as to uncover the port 54, pressure is again admitted to the head end of the cylinder 14, the pressure fluid being transferred through the valve chamber 17' from the port 52 to the port 54 entering the cylinder by way of passage 55.

Figures 6, 7:
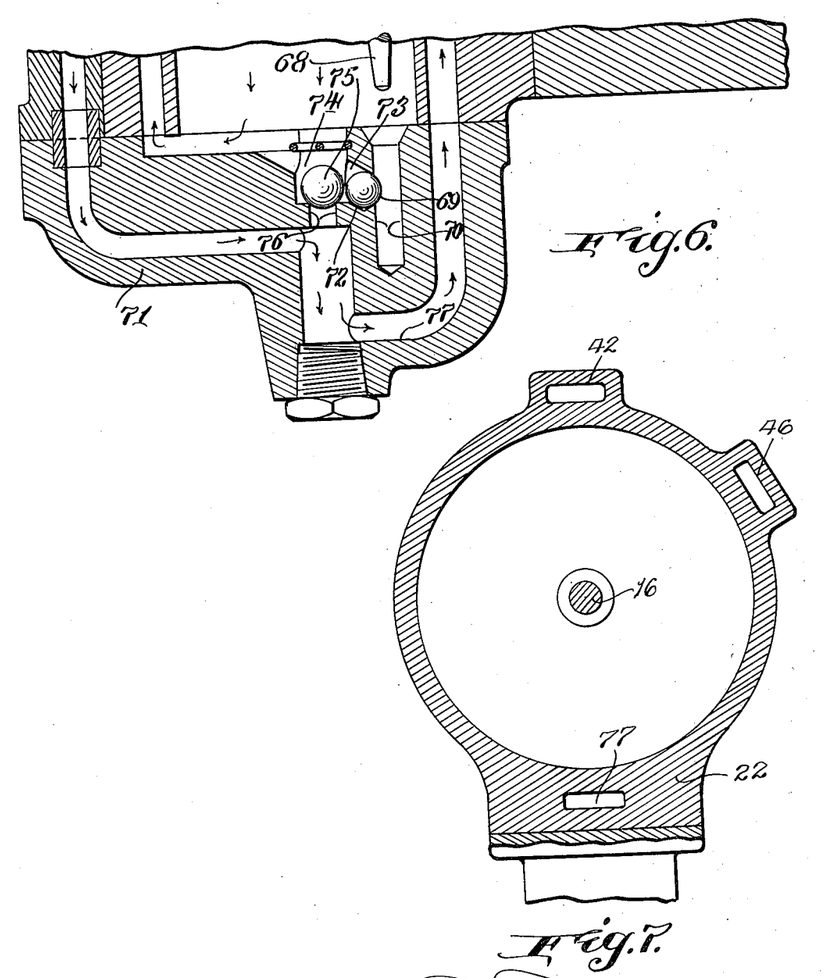
Figure 6 is an enlarged sectional view on the line 6—6 in Figure 1 illustrating a fragment of the bottom of the stoker motor control valve cylinder corresponding to the illustration in dotted lines in Figure 3, showing the operation of the quick discharge valve or release valve.
Figure 7 is a transverse section on the line 7—7 in Figure 2, looking to the right in said figure.

This by-passing of the hydraulic fluid at low pressure continues until the piston valve assembly 61 moves downwardly to a sufficient degree to cause the abutment 66 to contact the valve moving the valves 60 and 53, which are carried thereby downwardly to a position in which pressure and exhaust port 54 leading to the stoker motor cylinder 14 is uncovered. Near the end of the downward stroke of the piston valve 61, the lower piston 63 of the member 61 comes into contact by means of its downwardly projecting shank 68, see particularly Figure 6, with a suitable quick release valve. This valve is shown in Figure 6 as comprising an actuating ball 69 which in its normal position projects into a passage or bore 70 in the lower end or head 71 of the control valve cylinder 17, the passage being of necessity disposed in the direction of the stroke of the valve piston. This ball 69 has a seat 72 in a transverse passage 73 which connects with a release passage 74 containing a ball valve 75 which covers a seat 76 leading to the supplemental exhaust passage 77. The normal position of the ball 69 in its seat 72 is immediately adjacent or in contact with the ball 75 when on its seat 76 and the contact of the shank 68 with the ball 69 has the effect of thrusting the ball 69 to the left in Figure 6 out of the path of said shank causing the ball 69 to thrust the ball valve 75 in a similar direction whereby it is unseated opening the release passage 74 to the supplemental exhaust 77. This passage 77 is connected to the exhaust end of the main cylinder 14, i. e. at the right in Figure 3, which end is at the time open by way of passage 48' and port 48 to the exhaust port 45 which is connected to reservoir 5 through the passage 46, see Figures 3 and 4. This valve 75 on the return stroke of the piston valve 61 is freely removed from its seat to permit the fluid to return piston valve 61.

The opening of release valve 75 leading to the supplementary exhaust passage 77 permits the piston valve 61 to move instantaneously to the bottom end of its stroke opening the valve port 54 and cylinder port 55 connected thereto instantaneously, providing for a quick admission of a large volume of hydraulic fluid under pressure to the head end of the main hydraulic cylinder 14, i. e. the end at the left in Figure 3. This occurs at the beginning of the forward or working stroke. The same operation closes the port 57 leading to the by-pass 56 and brings the flapper valve 53 in line with port 52, but the pressure of the incoming fluid opens the flapper valve. The admission of the fluid under these circumstances to the head end of the main cylinder gives a quick forward stroke of piston 15 with a correspondingly quick stroke of the ram which has the advantage in the operation of the stoker that it tends to break the encrusted coke and coal at the top of the retort having an upheaving effect whereby the fuel is caused to overflow onto the twyer blocks. This upheaving effect breaks the fuel bed and provides for complete aeration. This operation, i. e. the quick forward stroke, has the further advantage that it overcomes the tendency to pack the coal incident to a slow motion stroke of the ram. The high speed of the ram which is attained immediately at the beginning of the working stroke is regarded as an important feature of the invention, not only in connection with the operation of the ram, but in connection with the operation of the slicer bars, which in the application previously referred to are timed to conform to the operation of the ram, being connected thereto to operate concurrently therewith.

The forward stroke of the piston 15 takes place in the position of the control valve 38 in which it is shown in Figure 3. In this position of the valve the passage 46' and port 48 leading to the end of the cylinder 14 at the right in Figure 3, which has been described as the forward end in that it is at the termination of the working stroke, is open to the reservoir, i. e. to the exhaust by way of port 45, permitting a quick release of the hydraulic fluid in front of the piston.

When piston 15 reaches the termination of its working stroke, the pilot valve 35 is shifted by means of the rod 33 actuated by the rocker arm 29 shown in Figure 5. The change of position of the valve 35 causes the control valve 38 to shift to the opposite position from that shown in Figure 3. Thus the port 47 and passage 49, 50 are connected to the exhaust, i. e. to the reservoir, by way of port 45 and the passage 48' is connected through port 48 to the supply of hydraulic fluid under pressure, i. e. to the delivery side of the pump.

Simultaneously with the termination of the forward stroke of the piston 15, the stoker motor piston valve assembly 61 is moved instantaneously to the top of its stroke by the action of the hydraulic fluid entering the casing 17 by way of passage 77 from the rear end of cylinder 14. The shoulder 65 of this piston assembly coming in contact with the floating valve 60, moves it and the valve 53 to the upper position in which the port 54 is covered, the flapper valve 53 serving, during the upward motion of the piston valve 61 prior to contact of the shoulder 65 with the valve 60, to prevent the fluid which is entering the valve chamber 17 by way of the passage 54 from being forced by way of port 52 and passage 51, 50 into the space above the piston 61, which would result in retarding the upward stroke of the piston valve 61. When the floating valve 60 and the flapper valve 53 are shifted by contact with the shoulder 65, the upward stroke of the valve 61 has been completed. Port 57 is uncovered and the stoker motor cylinder 14, see Figure 3, is then exhausted through the ports 54, 57, by the yielding of the valve 60, the valve 60 being raised from its seat as permitted by the clearance at 64' shown between this valve and the shaft, see particularly Figures 11 and 12. When exhaust has taken place by-passing begins and the piston 61 moves slowly on its down stroke.

The cycle of operation of the hydraulic motor thus completed, is repeated every time the pilot valve 35 is shifted to the left in Figure 3 by the completion of the forward and return stroke of the piston 15. The valve mechanism in the casing 17 is a timing device, the speed of which is dependent on the speed of the piston 61 which moves very slowly except at the points named when there is a quick motion. The slow motion of this piston is due to the slow transfer of the liquid through passage 77 and the variable throttle valve passage 77' in the timing throttle valve structure 150. The speed of the liquid and hence of the entire apparatus is further adjusted by the calibrated valve 150, see Figure 11. This may have an opening 151 which by rotation of the handle 152 is brought to a greater or less degree into registration with its passage 77 determining its cross section and capacity, and hence the interval between the successive strokes of the piston 15.

In addition to the foregoing, it is of interest to note the position of the pump 6 within the reservoir 5, having its intake or suction passage 6' exposed within the reservoir, dispensing with the usual suction pipe. The discharge end of the pump is connected to the passage 37 within the enbloc casting 22.

Figure 8:
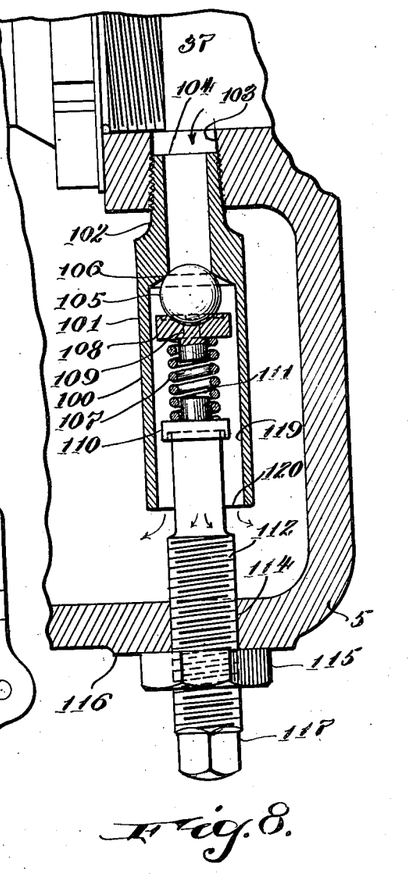
Figure 8 is an enlarged fragmentary section through a portion of the pump casing or oil reservoir showing the improved pressure release valve.
Figure 9:
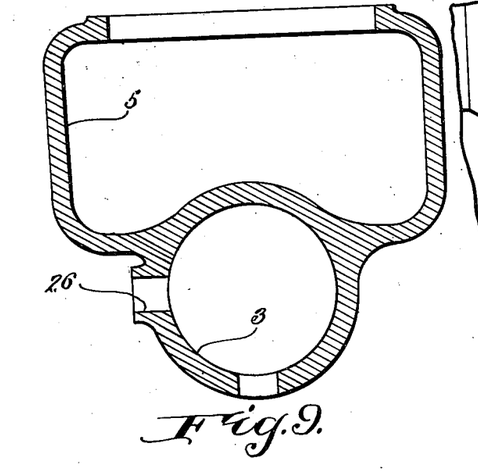
Figure 9 is a section on the line 9—9 in Figure 2 and showing the ram guide and the fluid reservoir.
Figure 10:
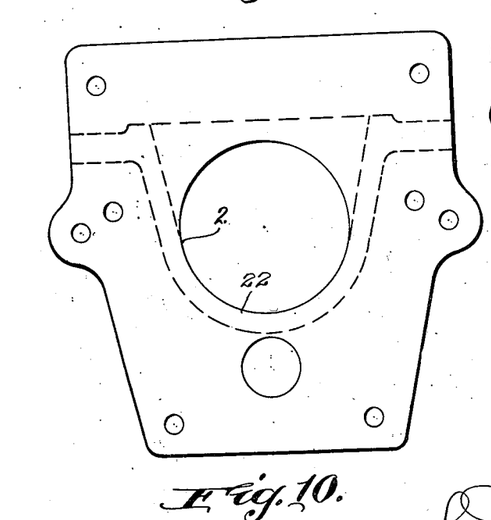
Figure 10 is an elevation of the hopper feed trough looking from the left in Figure 2.

An element which is also of interest is the pressure relief valve shown in detail in Figure 8 and indicated by reference character 100. This valve has a casing 101 in the form of a plug having a hollow threaded shank 102, which is threaded into a wall of the pump pressure or delivery passage 37 being seated in a threaded hole 103. The intake passage of the relief valve extends through the hollow shank 102, said passage being indicated by reference character 104. The valve member proper consists of a ball 105 which is pressed against a suitable seat 106 by means of a spring 107 which engages at one end the ball cap 108 which is suitably formed to center and bear upon the ball, the cap 108 is further provided with a pin 109 which serves to align it with the spring 107, said spring being in the form of a helix. The spring bears at its opposite end on a suitable base or support 110 which has a centering pin 111 inside the helical spring. This base 110 is engaged by an adjusting screw 112 which projects outwardly through the pump casing, having a threaded engagement with a suitable aperture at 114, the threaded pin 112 carries a lock nut 115 outside the reservoir 5 and bearing against a suitable boss 16 thereon. The outer end of the adjusting screw 112 is shown as provided with a head 117 which is square or otherwise suitably formed to be engaged by a wrench. The discharge of the liquid through and from the seat 106 takes place in the direction of the axis of the plug or casing 101, as shown. The plug is bored centrally, i. e., in line with its axis at 119. This opening 119 is larger than the screw 112 providing a discharge opening at 120 around the screw 112 and opposite to the hollow shank 102. The relief valve body or plug 100 is shown as located within the reservoir. The screw shank 102 extends through the wall which separates the reservoir from the pressure discharge passage 37 and the entire relief valve, including the adjusting screw 112, extends across the pump chamber from the passage 37 to and through the outside wall through which the adjusting screw 112 is introduced. In setting up the valve the screw 112 is screwed inwardly until it contacts the base 110 after which the screw is further advanced to apply the proper tension to the spring 107 which holds the ball valve 105 in contact with its seat.

The object of the relief valve is to relieve or release the pump pressure, i. e., the pressure of the hydraulic fluid in case of obstruction of the ram which might result from tramp iron, slate or other foreign material in the feed passage. It will be understood that if for any reason the piston 15 or the parts operated thereby become cramped, the pressure of the hydraulic fluid would build up to such an intensity that considerable danger of rupturing or bursting the various elements of the apparatus, particularly the cylinders, passages, etc., would be involved. With the relief valve, however, whenever the pressure in the pump delivery pipe 37 reaches a predetermined maximum, a portion of the liquid is passed therefrom directly to the reservoir which contains the liquid at low pressure, usually atmospheric pressure, and the parts are thus protected against excess pressures.

It is also of interest that the pump cylinder head is provided with an adjusting screw plug 122 which projects from the cylinder head, see Figure 12, being engaged with a threaded hole 124 in the head and threaded through a portion of the outer wall of the head and advanced into the by-pass exhaust passage 56. This screw plug 122 has a head 125 engageable by a wrench, and it is also provided with a locknut 126 to hold it in adjusted position. By turning the screw plug to the desired position of adjustment, the size and hence the capacity of the passage 56 may be varied and adjusted. The partial closing of the by-pass in this way to a predetermined extent gives a predetermined back pressure of the fluid which is the pressure available for operation of the stoker motor control valve piston 61.

The operation of the intermittent hydroelectric stoker motor has been quite fully discussed in connection with the description of the machine itself. Aside from the arrangement of the parts whereby intermittent operation is effected and the period intervening between working strokes is varied without changing the actual speed of the working stroke of the piston; and the arrangement and combination of parts whereby the fluid is by-passed so that during the entire period of operation except the working stroke of the piston which is the forward stroke, the fluid is circulated at a very low pressure which corresponds to minimum load, the return stroke of the piston being also accomplished at a high speed with a correspondingly low pressure so that the minimum amount of work is placed on the motor and the minimum of current is used, the important feature of the invention resides in the construction of the main cylinder, the ram guide, the feed trough and the reservoir in a single piece, avoiding the necessity for flanged or other connections between the parts with the usual packed joints which are apt to leak under high pressure or to become leaky after extended use, and this arrangement or construction of these parts in a single piece also, as already pointed out, avoids the necessity for piping with the consequent expense and tendency to leakage.

We have thus described specifically and in detail a preferred form of the motor in order that the manner of constructing, applying, operating and using the invention may be fully understood, however, the specific terms herein are used descriptively rather than in a limited sense, the scope of the invention being defined in the claims.

What we claim as new and desire to secure by Letters Patent is:

1. A stoker motor of the electrohydraulic type having a main cylinder, a reservoir for the hydraulic fluid, a feed trough and a ram guide formed in a single casting.

2. A stoker motor of the electrohydraulic type comprising a main cylinder having a piston therein, a reservoir for the hydraulic fluid, a feed trough and a ram guide, all formed in a single casting, said reservoir having a pump therein to provide the necessary operative pressure of the hydraulic fluid, there being passages in said casting connecting said reservoir and cylinder for the transmission of fluid from the cylinder to the reservoir and vice versa.

3. In a hydroelectric drive for a stoker, a main cylinder, a ram guide, a feed trough, a reservoir for the hydraulic fluid formed in a single casting, a pump for placing the fluid under the desired operative pressure, a piston control valve casing and a motor control valve casing secured to said casting, the casting including passages formed therein for transferring the hydraulic fluid from the pump to the cylinder by way of the valve casings and back to the reservoir.

4. In a hydroelectric drive for a stroker, a main cylinder having a piston therein, a ram guide, a feed trough and a reservoir for the hydraulic fluid formed in a single casting, a pump for placing the fluid under the desired operative pressure, and a piston control valve casing having a piston control valve therein secured to the main cylinder, a stoker motor control valve casing also secured to the main cylinder, the casting including passages formed therein for transferring the hydraulic fluid from the pump to the cylinder by way of the valve casings and back to the reservoir, the ram guide being slotted to provide for the extension through the casting of means whereby the control valve is operated from the ram.

5. In a hydroelectric drive for a stoker, a main cylinder having a piston therein, a ram guide, a feed trough and a reservoir for the hydraulic fluid formed in a single casting, there being a pump disposed in said reservoir for placing the fluid under the desired operative pressure, a piston control valve casing having a piston control valve therein secured to the main cylinder, a stoker motor control valve casing also secured to the main cylinder, the casting including passages formed therein for transferring the hydraulic fluid from the pump to the cylinder by way of the valve casings and back to the reservoir, the ram guide being provided with a slot, means extending through said slot and connected to said ram for operating the piston control valve, and means for operating the stoker from the ram.

6. In a hydroelectric stoker motor a reservoir, a pump, a main cylinder, a main piston therein, a piston control valve having a chamber, means supplying fluid thereto under pressure, a stoker motor control valve having a valve cylinder and piston with spaced abutments, a by-pass from the stoker motor control valve cylinder to the reservoir having a port in said cylinder, a fluid pressure supply and exhaust passage controlled by the piston control valve leading to one end of the stoker motor control valve cylinder, and a passage terminating in a port near the center of the stoker motor control valve cylinder connected to said passage, a pressure supply and exhaust port in the valve cylinder connected to the main cylinder at the head end, a float valve and a nonreturn valve mounted on said stoker motor control valve piston to be moved at intervals by said abutments a distance less than the stroke of the valve piston providing for the by-passing of the fluid from the pump through the stoker motor control valve cylinder back to the reservoir through said valve cylinder closing the last mentioned port during such by-passing and then closing the by-pass and leading the fluid to the head end of the main cylinder, the main cylinder having a passage leading from its rear end to the valve cylinder at the end opposite the head end whereby the fluid is exhausted from said rear end as pressure fluid is admitted to the head end, the passages at the opposite ends of the stoker motor control valve cylinder providing for the admission of pressure to the said ends alternately to move the valve at predetermined intervals which are independent of the speed of the main piston.

7. In a hydroelectric stoker motor having a main cylinder with a piston therein, means for supplying fluid under pressure, a pilot valve with means for shifting the same near the end of each stroke of the main piston, a piston control valve operated by the fluid, under control of the pilot valve and having means for supplying fluid under pressure thereto for distribution by said valve, a stoker motor control valve having a cylinder and piston and a pressure exhaust passage connecting the piston control valve to the head end of the cylinder of the stoker motor control valve to operate the same to admit fluid under pressure to the head end of the main cylinder, a pressure and exhaust passage connecting an end of the piston control valve to the rear end of the main cylinder to supply fluid under pressure to the main cylinder at the rear end, and to exhaust the fluid therefrom, a passage connecting the end of the stoker motor control valve cylinder opposite to said head end to said latter passage to operate the stoker motor control valve, the stoker motor control valve having by-pass ports and connections whereby the hydraulic pressure is normally by-passed through said valve at relatively low pressure, the stoker motor control valve including means for closing the by-pass and admitting fluid under pressure to the head of the main cylinder at intervals determined by the stoker motor control valve and dependent upon the flow of the fluid through said passages at the opposite ends of the stoker motor control valve chamber.

8. In a hydroelectric stoker motor of the intermittent type described a stoker motor control valve cylinder having a piston, a floating valve therein, a pressure and exhaust port and a by-pass and exhaust port controlled thereby, a flapper valve moving with the floating valve, a supply port controlled by the floating valve which is free to open under pressure from the supply, abutments carried by the piston spaced by a distance considerably exceeding the corresponding dimension of the floating valve, a pressure supply port at the head end of the valve cylinder and a port at the opposite end of the valve cylinder connected with the rear end of the stoker motor cylinder, the piston being reciprocated by the action of the fluid to cover and uncover the pressure port and the by-pass ports alternately, the flapper valve serving to admit hydraulic fluid under pressure to the valve cylinder and to prevent exhaust through the supply port, the floating valve being free to move in the direction of the valve cylinder radius to partially open the pressure port in response to exhaust pressure from the motor cylinder, the valve cylinder having a quick release to provide for a quick motion of the valve at one end of its stroke and a quick opening of the pressure port, and means for timing the piston to determine the intervals between working strokes of the motor, the capacity of said passages to vary and determine said intervals.

9. In a hydroelectric stoker motor of the intermittent type a main cylinder and a piston therein, a feed ram connected to said piston, an electric motor driven pump for supplying fluid under pressure to the head end of the cylinder, a by-pass permitting the hydraulic fluid to be kept normally in motion by the pump at low pressure, means for admitting fluid under pressure to the head end of the cylinder for the working stroke and means for controlling said admission to the main cylinder and said by-pass, whereby the by-pass is closed and the fluid is admitted to the head of the main cylinder at predetermined intervals, hydraulic means for controlling said closing means to operate at predetermined intervals after the termination of each working stroke, the speed of the working stroke being independent of said intervals, and means for returning the piston after each stroke.

10. In a hydroelectric stoker motor of the intermittent type a main cylinder and a piston therein, an electric motor driven pump for supplying fluid under pressure to the head end of the cylinder, a by-pass permitting the hydraulic fluid to be kept normally in motion by the pump at low pressure, means for admitting fluid under pressure to the head end of the cylinder for the working stroke and means for controlling said admission to the main cylinder and said by-pass, whereby the by-pass is closed and the fluid is admitted to the head of the main cylinder at predetermined intervals and hydraulic means for controlling said closing means to operate at predetermined intervals after the termination of each working stroke, the speed of the working stroke being independent of said intervals, and means for varying said intervals, and means for returning the piston after each stroke.

11. In a hydroelectric stoker motor of the intermittent type, a main cylinder with a piston therein, a stoker motor control valve chamber with a piston valve therein, an electric motor driven pump for supplying fluid under pressure, means connected to the pump for admitting fluid to the head end of the valve casing, an inlet and exhaust port in the valve casing adapted to be connected to the fluid supply under pressure and to the exhaust, a by-pass and exhaust passage and port, a pressure port and an inlet and exhaust port in the valve casing, the latter being connected to the head end of the main cylinder, a floating valve having means connected to the valve piston for operating the same at intervals corresponding to the operation of the piston to cover and uncover the by-pass port and the pressure port alternately, a flapper valve carried by the floating valve and adapted to close the inlet and exhaust port in the said valve chamber to prevent the discharge of pressure therethrough from said valve casing but permitting the admission of fluid under pressure to the valve casing, means connecting the end of the valve casing opposite to the aforesaid head end to the rear end of the main cylinder, the connections serving to operate the valve piston by means of the fluid under pressure providing for the by-passing of the fluid under low pressure during the main portion of the cycle of operations, and for closing the said by-pass and admitting fluid under pressure to the head of the main cylinder after the expiration of a predetermined period following each stroke of the main piston.

12. In a hydroelectric stoker motor of the intermittent type, a main cylinder with a piston therein, a stoker motor control valve chamber with a piston valve therein, an electric motor driven pump for supplying fluid under pressure, means connected to the pump for admitting fluid to the head end of the valve casing, an inlet and exhaust port in the valve casing adapted to be connected to the fluid supply under pressure and to the exhaust, a by-pass and exhaust passage and port, a pressure port and an inlet and exhaust port in the valve casing, the latter being connected to the head end of the main cylinder, a floating valve having means connected to the valve piston for operating the same at intervals corresponding to the operation of the piston to cover and uncover the by-pass port and the pressure port alternately, a flapper valve carried by the floating valve and adapted to close the inlet and exhaust port in the said valve chamber to prevent the discharge of pressure therethrough from said valve casing but permitting the admission of fluid under pressure to the valve casing, means connecting the end of the valve casing opposite to the aforesaid head and to the rear end of the main cylinder, the connections serving to operate the valve piston by means of the fluid under pressure providing for the by-passing of the fluid under low pressure during the main portion of the cycle of operations, and for closing the said by-pass and admitting fluid under pressure to the head of the main cylinder after the expiration of a predetermined period following each stroke of the main piston, said period being adjustable by controlling the flow of fluid to the valve chamber, said adjustment being independent of the speed of the main piston.

13. In a hydroelectric stoker motor of the intermittent type, a main cylinder with a piston therein, a stoker motor control valve chamber with a piston valve therein, an electric motor driven pump for supplying fluid under pressure, means connected to the pump for admitting fluid to the head end of the valve casing, an inlet and exhaust port in the valve casing adapted to be connected to the said pump under pressure and to the exhaust, a by-pass and exhaust passage and port, a pressure port and an inlet and exhaust port in the valve casing, the latter being connected to the head end of the main cylinder, a floating valve having means connected to the valve piston for operating the same at intervals corresponding to the operation of the piston to cover and uncover the by-pass port and the pressure port alternately, a flapper valve moving with the floating valve and adapted to close the inlet and exhaust port in the said valve chamber to prevent the discharge of pressure therethrough from said valve casing but permitting the admission of fluid under pressure to the valve casing, means connecting the end of the valve casing opposite to the aforesaid head and to the rear end of the main cylinder, the connections serving to operate the valve piston by means of the fluid under pressure providing for the by-passing of the fluid under low pressure during the main portion of the cycle of operations, and for closing the said by-pass and admitting fluid under pressure to the head of the main cylinder after the expiration of a predetermined period following each stroke of the main piston, said period being adjustable by controlling the flow of fluid to the valve chamber, said adjustment being independent of the speed of the main piston, the pressure applied to said hydraulic means being adjustable by changing the capacity of the by-pass and means for adjusting such capacity, and a quick discharge means, the piston valve operating near the end of its stroke.

14. In a stoker motor of the hydraulic type, a pump, a motor for operating the pump, a hydraulic motor having a cylinder and a reciprocating piston therein, means for controlling the hydraulic motor to operate at predetermined controllable intervals including a by-pass providing for a continuous flow of the fluid during said intervals, and means for closing said by-pass providing a full supply of hydraulic fluid to the motor at full pressure to give a quick forward and return stroke of the hydraulic piston at the end of each said interval, the speed of the stroke being independent of the length of the interval between strokes.

15. A stoker motor of the hydraulic type having a pump, a motor for operating the pump, a hydraulic motor having a cylinder and a reciprocating piston therein, means for controlling the hydraulic motor to operate at predetermined controllable intervals including a by-pass providing for a continuous flow of the fluid during said intervals, and means for closing said by-pass providing a rapid full supply of hydraulic fluid to the motor at full pressure to give a quick forward and return stroke of the hydraulic piston at the end of each said interval, the speed of the stroke being independent of the length of the intervals and means for controlling the by-pass to determine the length of the intervals between strokes.

16. A stoker motor having a control valve and a stoker motor valve, a cylinder and piston with ports connecting the stoker motor valve to the cylinder, the stoker motor valve having by-pass ports whereby the hydraulic fluid is permitted to flow continuously therethrough for a predetermined period which intervenes between the strokes of the motor piston, and means for closing the by-pass and at the same time opening a passage through the cylinder head providing a free flow of hydraulic fluid under pressure and immediately thereafter a free escape of the exhaust whereby the motor piston is caused to make a quick forward and return stroke at the end of each by-passing period, an electric motor and a pump for supplying the fluid under pressure, the by-pass serving to permit the electric motor to operate at minimum load throughout the periods intervening between the working strokes.

17. A stoker motor of the periodic type having a stoker motor valve, a control valve, a motor cylinder and piston, the cylinder having intake and exhaust passages opened and closed by said control valve, the stoker motor valve being in the form of a piston valve having piston heads spaced apart, a casing for said valve having three ports intermediate of its length comprising an intake and discharge port connected to the head of the motor cylinder, a by-pass port connected to the exhaust and a check valve port adapted to be connected to the intake and discharge passage at the head of the motor cylinder, said passage being also connected to the head of the motor valve cylinder, an exhaust passage connected to the opposite end of the motor valve cylinder and having a throttle for determining the speed of the valve stroke and a quick discharge valve with means whereby the same is opened by the piston as it advances toward that end of the cylinder, a floating valve for closing the intake port and the by-pass port alternately, the same being located between the valve piston heads and moved thereby from one closed position to the other, the by-pass port and the check valve port serving to provide a free passage for the motor fluid during the entire stroke of the valve piston up to the time it engages and operates the quick discharge valve, the floating valve closing the intake and discharge passage to the motor cylinder head during said period, the intake and discharge passage being opened and the by-pass port being closed by the floating valve when the valve piston contacts the quick discharge valve providing quick access of the fluid under pressure to the head of the motor cylinder at the instant the discharge valve which is connected to the rear end of the cylinder is opened, the said rear end of the cylinder being at the same time open to the exhaust through the control valve.

18. A stoker motor of the periodic type having a pump, a stoker motor valve, a control valve, a motor cylinder and piston, the cylinder having intake and exhaust passages opened and closed by said control valve, the stoker motor valve being in the form of a piston valve having piston heads spaced apart, a valve cylinder having three ports intermediate of its length comprising an intake and discharge port connected to the head of the motor cylinder, a by-pass port connected to the exhaust and a flapper valve port connected to the intake and discharge passage in the head of the motor cylinder, said passage being also connected to the head of the motor valve cylinder, an exhaust passage connected to the rear end of the motor valve cylinder and having a throttle for determining the speed of the valve stroke and a quick discharge valve with means whereby the same is opened by the piston as it advances toward that end of the cylinder, a floating valve for closing the intake port and the by-pass port alternately, the same being located between the valve piston heads and moved thereby from one closed position to the other, the by-pass port and the flapper valve serving to provide a free passage for the motor fluid from the pump during the entire stroke of the valve piston up to the time it engages and operates the quick discharge valve, the floating valve closing the intake and discharge passage to the motor cylinder head during said period, the said intake and discharge passage being opened and the by-pass port being closed by the floating valve when the valve piston contacts the quick discharge valve providing a quick supply of fluid under pressure to the head of the motor cylinder at the instant the discharge passage which is connected to the rear end of the cylinder is opened, the said rear end of the cylinder being at the same time open to the exhaust, the flapper valve also serving to close the flapper valve port to prevent the backstroke of the piston until control valve piston completes full upward stroke.

19. A stoker motor of the electrohydraulic type comprising a main cylinder having a piston therein, a reservoir for the hydraulic fluid, a feed trough and a ram guide, all formed in a single casting, said reservoir having a pump therein to provide the necessary operative pressure of the hydraulic fluid, there being passages in said casting connecting said reservoir and cylinder, and valve means in said passages for effecting transfer of the fluid from the reservoir to the cylinder and vice versa.

JAMES F. TURNER.
CHRISTIAN P. BREIDENBAUGH.